(12) United States Patent
Wendel et al.

(10) Patent No.: US 9,592,780 B2
(45) Date of Patent: Mar. 14, 2017

(54) DEVICE FOR ABSORBING KINETIC ENERGY, IN PARTICULAR FOR INSTALLING IN A MOTOR VEHICLE

(71) Applicant: AUDI AG, Ingolstadt (DE)

(72) Inventors: Bettina Wendel, Nürnberg (DE); Carsten Klinkert, Hitzhofen (DE); Wolfgang Dorfner, Buxheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/888,324

(22) PCT Filed: Apr. 12, 2014

(86) PCT No.: PCT/EP2014/000985
§ 371 (c)(1),
(2) Date: Oct. 30, 2015

(87) PCT Pub. No.: WO2014/177250
PCT Pub. Date: Nov. 6, 2014

(65) Prior Publication Data
US 2016/0068125 A1    Mar. 10, 2016

(30) Foreign Application Priority Data

May 2, 2013    (DE) .................... 10 2013 007 594

(51) Int. Cl.
*B60R 19/26*    (2006.01)
*B60R 21/34*    (2011.01)

(52) U.S. Cl.
CPC .............. *B60R 19/26* (2013.01); *B60R 21/34* (2013.01); *B60R 2019/262* (2013.01)

(58) Field of Classification Search
CPC .... B60R 19/26; B60R 19/34; B60R 2019/262
(Continued)

(56) References Cited

U.S. PATENT DOCUMENTS 3,779,591 A * 12/1973 Rands ..................... F16F 7/127
                                                188/375
5,460,421 A * 10/1995 Culbertson ............. B60R 19/36
                                                188/377
(Continued)

FOREIGN PATENT DOCUMENTS

DE           197 45 656 A1    4/1999
DE   WO 2004/113131 A1   12/2004
(Continued)

OTHER PUBLICATIONS

International Search Report issued by the European Patent Office in International Application PCT/EP2014/000985.

*Primary Examiner* — Dennis H Pedder
(74) *Attorney, Agent, or Firm* — Henry M. Feiereisen LLC

(57) ABSTRACT

A device for absorbing kinetic energy includes a first stationary component and a second component that can be moved in relation to the first component, wherein at least one of the components converts energy by plastic deformation when a certain force level is exceeded, and comprising a coupling apparatus, which operatively connects the first component and the second component in such a way that the two components can be moved in relation to each other only with low energy conversion when the coupling apparatus is not activated and forces can be transmitted from one component to the other component when the coupling apparatus is activated. The movable component has a deformation element, which initially deforms in the event of a crash, so that a movement of the movable component occurs only thereafter, wherein the coupling apparatus is continuously in engagement with the two components and thus continuously produces a first low coupling force level and, when the coupling apparatus is activated, the coupling forces are (Continued)

increased from the first low coupling force level to a high coupling force level and plastic deformation of at least one component occurs.

11 Claims, 3 Drawing Sheets

(58) Field of Classification Search
USPC .......................................................... 293/133
See application file for complete search history.

(56) References Cited

U.S. PATENT DOCUMENTS

| | | | |
|---|---|---|---|
| 6,135,251 A | 10/2000 | Hartlieb et al. | |
| 7,347,465 B2* | 3/2008 | Jayasuriya | B60R 19/40 293/118 |
| 8,246,091 B1 | 8/2012 | Jayasuriya et al. | |
| 8,267,445 B1 | 9/2012 | Jayasuriya et al. | |
| 8,919,300 B2 | 12/2014 | Klinkert et al. | |
| 2010/0219649 A1* | 9/2010 | Schmidt | B60R 19/34 293/135 |
| 2013/0307288 A1* | 11/2013 | Wavde | B60R 19/34 296/187.05 |
| 2014/0207340 A1 | 7/2014 | Kunsch et al. | |
| 2015/0107929 A1 | 4/2015 | Kugler et al. | |
| 2015/0107930 A1 | 4/2015 | Kugler et al. | |
| 2015/0108770 A1 | 4/2015 | Kugler et al. | |

FOREIGN PATENT DOCUMENTS

| | | |
|---|---|---|
| DE | 102004029885 A1 | 1/2006 |
| DE | 102004047884 A1 | 4/2006 |
| DE | EP 1894792 A1 | 3/2008 |
| DE | 102006058043 A1 | 6/2008 |
| DE | 102008048678 A1 | 3/2010 |
| DE | 102011004957 A1 | 2/2012 |
| DE | 102010048861 A1 | 4/2012 |
| DE | EP 2 497 689 A1 | 9/2012 |
| FR | 2928318 * | 9/2009 |

\* cited by examiner

DEVICE FOR ABSORBING KINETIC ENERGY, IN PARTICULAR FOR INSTALLING IN A MOTOR VEHICLE

CROSS-REFERENCES TO RELATED APPLICATIONS

This application is the U.S. National Stage of International Application No. PCT/EP2014/000985, filed Apr. 12, 2014, which designated the United States and has been published as International Publication No. WO 2014/177250 and which claims the priority of German Patent Application, Serial No. 10 2013 007 594.7, filed May 2, 2013, pursuant to 35 U.S.C. 119(a)-(d).

BACKGROUND OF THE INVENTION

The invention relates to a device for absorbing kinetic energy, in particular for installing in a motor vehicle.

In motor vehicle construction, devices for absorbing kinetic energy for protecting persons in the event of a crash are known. These devices include for example a first stationary component and a second component that is movable relative to the first component, and a coupling device operatively connecting the first component and the second component. At least one of the components converts energy by plastic deformation when a certain force level is exceeded. The coupling device connects the two components so that in a non-activated state of the coupling device the two components can be moved in relation to each other with only low energy conversion, and in an activated state of the coupling device forces can be transmitted from one component to the other.

From DE 10 2008 048 678 A1 for example, a device for absorbing kinetic energy is known, in particular for installation in a motor vehicle. Depending on the load conditions, a movable component is coupled to a stationary component. In the event of a collision with a pedestrian, the two components are not coupled so that only a minimal amount of energy is absorbed. When no collision with a pedestrian is sensed, the two components are coupled to absorb energy at a high force level without loss of travel. The two components are not coupled continuously and a deformation element with a compressible soft foam is provided which is capable of initially yielding during a collision with a pedestrian.

SUMMARY OF THE INVENTION

Object of the invention is to provide a device for absorbing kinetic energy, particularly for installation in a motor vehicle, which enables an enhanced protection of pedestrians, wherein good energy absorption is also achieved in higher-intensity crashes.

According to the invention, the object is achieved by providing a device for absorbing kinetic energy, particularly for installation in a motor vehicle, including the features of patent claim. Advantageous embodiments and refinements of the invention are disclosed in the dependent claims.

Embodiments of the present invention provide a device for absorbing kinetic energy, in particular for installation in a motor vehicle, which includes a first stationary component and a second component that is movable in relation to the first component. At least one of the components converts energy by plastic deformation when a defined force level is exceeded. Furthermore, a coupling device is provided, which operatively connects the first component and the second component so that in a non-activated state of the coupling device the two components are movable in relation to each other with low energy conversion, and in an activated state of the coupling device forces can be transferred from one component to the other. According to the invention, the movable component includes a deformation element which, in the event of a crash, initially deforms, so that the movable component only moves subsequent thereto, wherein the coupling apparatus is continuously in engagement with the two components and thus continuously generates a first low coupling-force level and, upon activation of the coupling apparatus, the coupling forces are increased from the first low coupling-force level to a high coupling-force level and plastic deformation of at least one component occurs.

Embodiments of the device according to the invention advantageously enable different levels of pedestrian protection because the movable component includes a deformation element which is advantageously designed as a compressible foam element which, in the event of a crash, initially deforms so that the movable component only moves subsequent thereto. Hereby, the coupling apparatus is continuously in engagement with the two components and thus continuously generates a first low coupling-force level. Due to the low coupling-force level in the deactivated state of the coupling apparatus, the dimensions of the deformation element can be reduced so, an overhang of the vehicle can advantageously be shortened in a range of 30 to 60 mm while providing the same level of pedestrian protection. When, on the other hand, a low-speed or high-speed-crash is sensed, the coupling apparatus is activated and as a result an immediate increase of the coupling forces from the first low coupling-force level to a high coupling-force level so that subsequently a plastic deformation of at least one component occurs.

In an advantageous embodiment of the device for absorbing kinetic energy according to the invention, a locking element can be provided for activating the coupling device. This enables a simple and reliable switching of the device according to the invention between the different coupling-force levels.

In a further advantageous embodiment of the device for absorbing kinetic energy according to the invention, the coupling device can include at least one bracket, which connects the two components and which is pushed outwardly by the locking element toward the moving component in order to activate the coupling apparatus. The coupling element can be simply designed as movable bolt, which is movable from an unlocked state into a locked state. A good bracing effect of the brackets is achieved when the bolt is designed rotatable and with rounded edges, which act on a surface of the locking element and push the locking element outwardly through corresponding apertures within the movable second component into corresponding receptacles within the stationary component. This enables a simple and reliable implementation of the coupling device for the device for absorbing kinetic energy according to the invention.

In a further advantageous embodiment of the device for absorbing kinetic energy according to the invention, the stationary component can be arranged on a baffle plate of a longitudinal member. In the event of a crash, the movable component at least partially moves into the stationary component when the coupling apparatus is deactivated. When the coupling apparatus is activated, the movable component and the stationary component are firmly coupled to each other in the event of a crash and are plastically deformable by folding. Due to the fact that the stationary component rests against the baffle plate and the firm coupling of both components, good energy absorption is advantageously achieved by folding of the two components.

Alternatively, the stationary component can be directly connected to the longitudinal member, for example by a connecting flange. Hereby, the movable component at least partially moves into the longitudinal member in the event of a crash when the coupling device is deactivated. In this case the movable component can at least partially move into the longitudinal member in the event of a crash also when the coupling device is activated, wherein the coupling device plastically deforms the movable component during the entering by shearing. This advantageously enables good energy absorption due to shearing of the movable component. Alternatively, the movable component can be blocked in the event of a crash when the coupling apparatus is in the activated state and can be plastically deformed by folding. Due to a firm coupling of both components, good energy absorption is advantageously achieved by folding of the movable component.

In a further advantageous embodiment of the device for absorbing kinetic energy according to the invention, the longitudinal member can for example be designed as a single-chamber or two-chamber hollow section.

In a further advantageous embodiment of the device for absorbing kinetic energy according to the invention, a pre-crash-sensor present in the vehicle can be used, which activates the coupling apparatus prior to a collision when detecting a crash and which moves the locking element from the unlocked position into the locked position. Additionally or alternatively, the pre-crash-sensor provided in the vehicle can also be used to deactivate the coupling apparatus when detecting an imminent collision with a pedestrian and to move the locking element from the locked position into the unlocked position.

BRIEF DESCRIPTION OF THE DRAWING

Advantageous embodiments of the invention are shown in the drawing and are described below.

It is shown in.

DETAILED DESCRIPTION OF PREFERRED EMBODIMENTS

Figure 1:
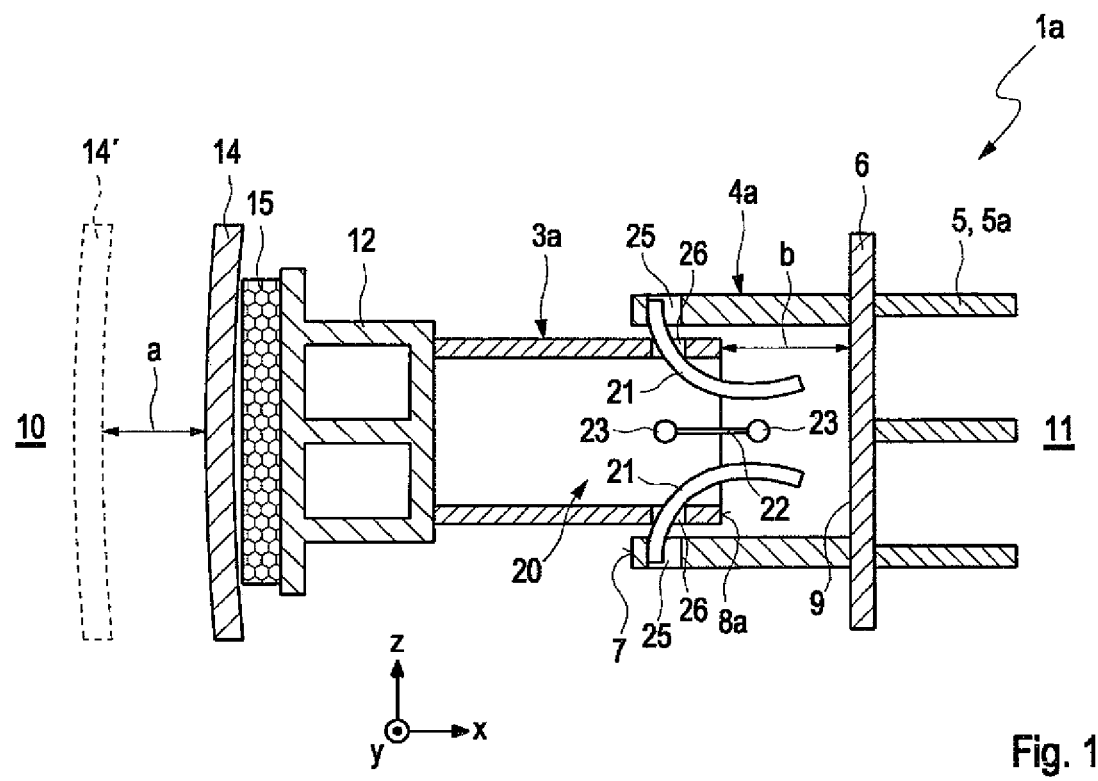
FIG. 1 a schematic representation of a first embodiment of the device for absorbing kinetic energy according to the invention switched to a soft mode, FIG. 2 a schematic representation of a device to absorb kinetic energy according to the invention switched to a rigid mode.
Figure 2:
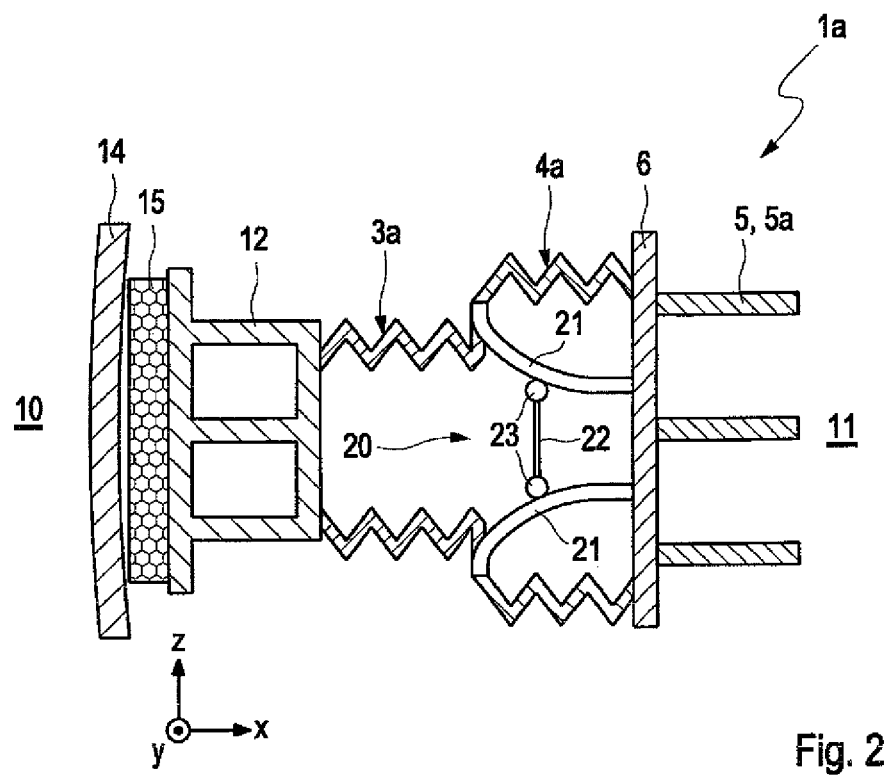

FIGS. 1 to 5 show embodiments of the device 1a, 1b, 1c according to the invention for absorbing kinetic energy for installation particularly in the front section of a motor vehicle. FIGS. 1 and 2 show a first embodiment of the device 1a according to the invention, which is designed as so-called folding box, in which a movable first component 3a with a smaller diameter moves into a stationary second component 4a with a greater diameter, until a deformation of at least one of the components 3a, 4a results. The second stationary component 4a is mounted to a longitudinal member 5a of the vehicle and has a terminal baffle plate 6. The movable first component 3a is for example designed as a tubular component and toward an exterior 10 of the vehicle is mounted to a bumper cross member 12, which may be designed as a hollow section. Further toward the vehicle exterior 10 a deformation element 15, configured as a foam element having a length of approximately 15 to 35 mm, is installed between the bumper cross member 12 and a bumper cover 14. The device 1a according to the invention is part of a bumper system for the motor vehicle front, which is essentially formed by the bumper cover 14, the foam element 15, the bumper cross member 12, the first movable component 3a and the second stationary component 4a and the baffle plate 6 on the longitudinal member 5a. Both components 3a, 4a are configured deformable. The first component 3a and the second component 4a form a so-called low-speed crash element. According to the invention, both components 3a, 4a are permanently connected to each other by a coupling device 20. The coupling device 20 is formed by at least one bracket 21 and a locking element 22. The second component 4a is supported on the baffle plate 6, which is arranged toward the vehicle interior 11 on the longitudinal member 5 of the vehicle. Hereby, the longitudinal member 5 is configured as a two-chamber section 5a.

The coupling device 20 is configured so that the movable component 3a and the stationary component 4b are constantly coupling. For this purpose, at least one bracket 21 is provided, wherein multiple brackets 21 can be provided on the circumference.

As further shown in FIGS. 1 and 2, the brackets 21 are advantageously arranged on the circumferences as pairs so as to oppose each other. The brackets 21 are inserted into receiving apertures 25 of the stationary component 4a and lead through apertures 26 of the movable component 3a into the interior of the movable components 3a. In the shown embodiment, the brackets 21 are overall configured in the form of a convergent nozzle, which tapers in longitudinal direction x of the vehicle, as viewed from left to right. In the shown embodiment, a locking element 22 is provided centrally in the movable component 3a between the brackets 21, and in the shown exemplary embodiment is configured as pivotable elongated bolt. Of course, other suitable embodiments of the coupling device are possible that ensure a rigid or loose coupling of the two components 3a, 4a in the event of a crash, to provide different force levels for absorbing crash energy.

FIG. 1 shows the device 1a in a normal state, i.e., prior to a collision, in which the bumper cover 14, shown in dashed lines, represents the position of the bumper cover 14 with a conventional deformation element having a length of 60 to 70 mm in a conventional motor vehicle. Due to the device 1a according to the invention for absorbing kinetic energy, a shortening a of the vehicle overhang in a range from 35 to 55 mm is possible, because compared to the conventional deformation element, the deformation element 15 of the device 1a according to the invention is configured significantly shorter while providing the same protection for persons.

In FIG. 1 the locking element 22 is in an unlocked position so that the locking element 22, configured as pivotable elongated bolt, is oriented in longitudinal direction x of the vehicle. Upon activation, the locking element 22 pivots into a locked position, in which it extends perpendicular relative to the longitudinal direction x of the vehicle, and in this case is oriented in vertical direction z of the vehicle. In the locked position, the locking element 22 pushes both brackets 21 outwardly in the direction of the stationary component 4a, so that the ends of the brackets 21 are held in corresponding receiving apertures 25 of the stationary component 4a. This results in a rigid coupling of both components 3a, 4a and prevents that the two brackets 21 move towards each other and that the rigid coupling between both components 3a, 4a is lost. The locked state of the coupling apparatus 20 is shown in FIG. 2.

In order to provide different levels of pedestrian protection, the locking element 22 can, as shown in FIG. 1, remain in its unlocked position during a collision with a pedestrian. This only marginally impedes the movement of the first component 3a, so that it can pass through a travel switched to soft configuration, designated b in FIG. 1, and can at least partially move into the stationary component 4a until a front side 8a of the first component 3a impacts an inside of the baffle plate 6. Thereby, the travel b is traversed with more or less low resistance due to the counteracting rigidity of the brackets 21. This allows providing an energy absorption with a lower force level adapted to a collision with a pedestrian so as to ensure higher protection for pedestrians.

The decision whether a collision with a pedestrian or a stronger low-speed or high-speed crash occurs, is detected, as is known, with a pre-crash-sensor which then activates the coupling device 20 during the low-speed or high-speed-crash and moves the locking element 22 from the unlocked position into the locked position. Additionally or alternatively, when an imminent collision with a pedestrian is detected, the coupling device can be deactivated and the locking element can be moved from the locked position into the unlocked position. Activation of the coupling device 20 leads to pivoting of the locking element 22, which is configured as a bolt, which pivoting pushes the brackets 21 apart, thus resulting in a high-force coupling of the two components 3a, 4a. As a consequence, directly after the deformation of the foam element 15, the movable component 3a and also the stationary component 4a are significantly deformed, which leads to a folding of both components 3a, 4a so that a higher collision- or crash energy can be absorbed. By appropriately selecting the stability or rigidity of the brackets 21 and their longitudinal extent in longitudinal direction x of the vehicle, a good control of the desired energy absorption can be achieved.

Figure 3:
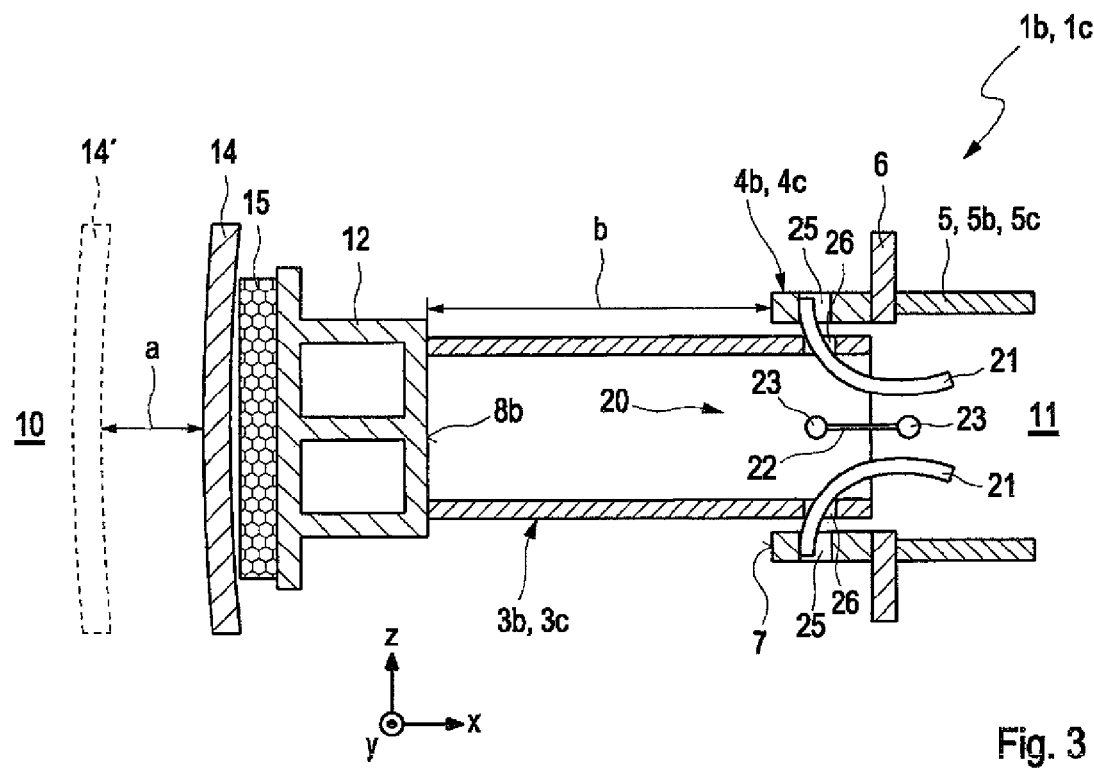
FIG. 3 a schematic representation of a second and third embodiment of a device to absorb kinetic energy according to the invention switched to a soft mode, FIG. 4 a schematic representation of a second embodiment of the device according to the invention to absorb kinetic energy according to FIG. 3 switched to a rigid mode, and FIG. 5 a schematic representation of a third embodiment of a device according to the invention for absorbing kinetic energy according to FIG. 3 switched to a rigid mode.
Figure 4:
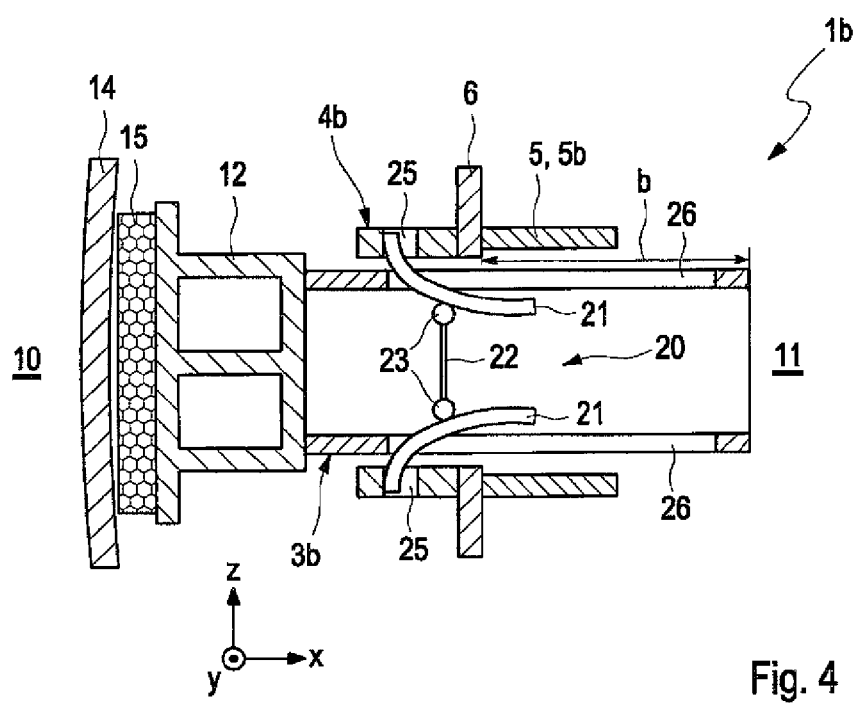
Figure 5:
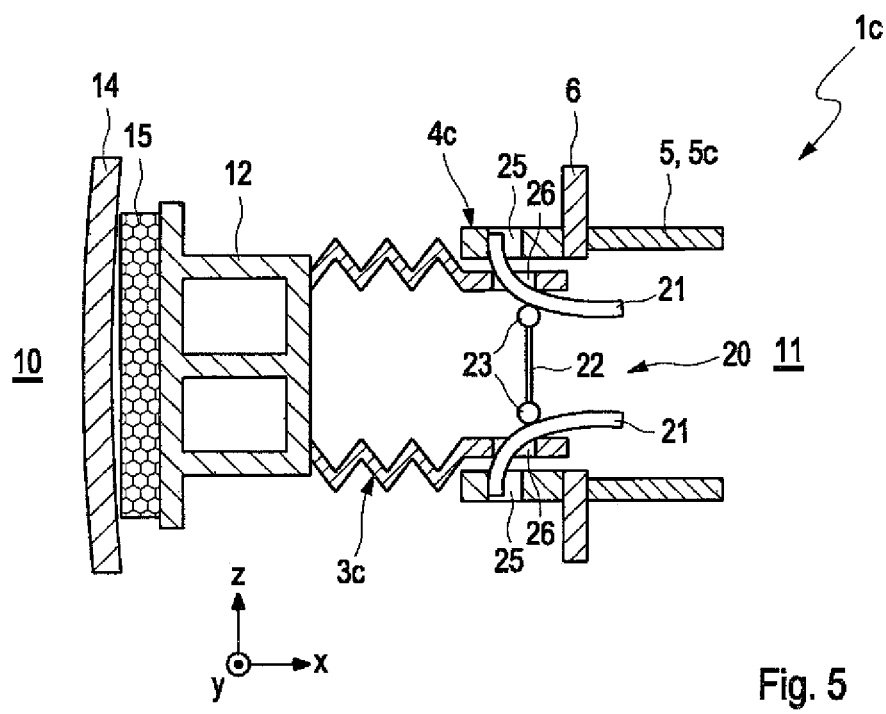

FIGS. 3 to 5 show two further exemplary embodiments of the device 1b, 1c according to the invention for absorbing kinetic energy, in which all components that are the same or have the same effect are provided with the same reference signs as the first exemplary embodiment according to FIGS. 1 and 2.

Analogous to the first embodiment, the locking element 22 in FIG. 3 is in the unlocked position so that the locking element 22, which is configured as a bolt, is oriented in longitudinal direction x of the vehicle. Analogous to FIG. 1, FIG. 3 shows the device 1b, 1c in the normal state i.e., prior to a collision with a pedestrian. Also in this case the bumper cover 14, shown in dashed lines, represents the position of the bumper cover 14 in a conventional deformation element with a length of 60 to 70 mm in a conventional motor vehicle. Also in the second and third exemplary embodiment of the device 1b, 1c according to the invention for absorbing kinetic energy, the vehicle overhang can be shortened in the range of 35 to 55 mm compared to conventional deformation elements, because the deformation element 15 of the device 1b, 1c according to the invention is configured significantly shorter compared to the conventional deformation element, while providing the same pedestrian protection.

In modification to the first embodiment, the second embodiment of the device 1b is configured as a so-called shear-box. No baffle plate is provided and the stationary component 4b is arranged on the longitudinal member 5 so that the movable component 3b can move into the longitudinal member 5 further to the right in longitudinal direction x of the vehicle. For this the longitudinal member 5 is constructed as single-chamber hollow section 5b. In FIG. 3, a soft mode for enhanced pedestrian protection is shown, in which the coupling device 20 is in the non-activated state. Analogous to the first exemplary embodiment according to FIG. 1, a travel b is provided, wherein the brackets 21 only pose a low resistance. The movable component 3b can be moved backward quasi unimpeded, wherein only the friction and the holding force or the restoring force of the brackets 21 counteract the movement. This only insignificantly impedes the movement of the first component 3b, so that it can move along the travel b which is switched to a soft mode. The maximum travel b is reached when the front face 8 of the bumper cross member 12, which is moved with the first component 3b, impacts the front face 7 of the stationary component 4b. Of course shorter travels can also be provided by appropriate measures. As described for FIG. 1, also in FIG. 3 the first component 3b moves only after deformation of the foam element 15, so that different levels of pedestrian protection are achieved.

As further shown in FIG. 4, upon activation, the locking element 22, analogous to the first exemplary embodiment, pivots into a locked position, which extends perpendicular relative to the longitudinal direction x of the vehicle, and which in the present case is oriented in a vertical direction z of the vehicle. In the locked position, the locking element 22 pushes the two brackets 21 outwardly towards the stationary component 4b, so that the ends of the brackets 21 are held in corresponding receiving apertures 25 of the stationary component 4b. This results in a rigid coupling between the two components 3b, 4b and prevents that the two brackets 21 move towards each other and that the rigid coupling between both components 3b, 4b is lost.

When a low-speed or high-speed crash is sensed, the coupling device 20 is activated thereby resulting in a strong coupling of the components 3b, 4b at the beginning of the crash. In the locked state of the coupling device 20 the brackets 21 engaging into the apertures 26 of the movable component 3b then lead to a shear-effect of the bracket 21 in the aperture 26, which is then increased in correspondence to the traveled deformation path so that collision- or crash energy is absorbed. The rigid component 4b also absorbs forces and transmits them into the longitudinal member 5 without being significantly deformed. The longitudinal member itself, however, can change its structure due to the entering component 3b.

In modification to the second exemplary embodiment, the third exemplary embodiment of the device 1c is, analogous to the first embodiment, constructed as so-called folding box. However, no baffle plate is provided and the stationary component 4c is arranged on the longitudinal member 5, so that the movable component 3c can move into the longitudinal member 4 further to the right in longitudinal direction x of the vehicle. Analogous to the second exemplary embodiment, the longitudinal member 5 is hereby configured as a single-chamber hollow section 5c. FIG. 3 shows the soft mode for enhanced pedestrian protection, with the coupling device 20 in the non-activated state. Analogous to the second embodiment, a travel b is provided, wherein the brackets 21 only pose a low resistance. The movable component 3c is displaceable substantially freely backwards, wherein only the friction and the holding force or restoring force of the brackets 21 counteract the displacement. Thereby, the movement of the first component 3c is only inconsiderably impeded so that it can move along the travel b which is switched to a soft mode. The maximum travel b is reached when the front surface 8 of the bumper cross member 12, which is moved with the first component 3c, impacts the front surface 7 of the stationary component 4c. Shorter travels can of course also be provided by appropriate measures. As described for the first and second embodiment, also in the third embodiment, the first component 3c only moves subsequent to deformation of the foam element 15, so that different levels of pedestrian protection are achieved.

As further shown in FIG. 5, analogous to the first and second exemplary embodiments, upon activation the locking element pivots into a locked position, which extends perpendicular relative to the longitudinal direction x of the vehicle, and which in the present case is oriented in vertical direction z of the vehicle. In the locked position, the locking element 22 pushes the two brackets 21 outwardly towards the stationary component 4c, so that the ends of the brackets 21 are held in corresponding receiving apertures 25 of the stationary component 4b. This results in the rigid coupling between the two components 3b, 4b and prevents that both brackets 21 move towards each other and that the rigid coupling between the two components 3c, 4c is lost.

When a low-speed or high-speed crash is sensed, the coupling device 20 is activated thereby resulting in a strong coupling of both components 3c, 4c at the beginning of the crash. The brackets 21, which are engaging in the apertures 26 of the movable component 3b then, in the locked state of the coupling device 20, lead to a blocking of the movable component 3c so that collision- or crash energy is absorbed by folding of the movable component 3c. The rigid component 4c also absorbs forces and transmits them into the longitudinal member 5 without being significantly deformed.

The invention claimed is:

1. A device for absorbing kinetic energy, comprising:
   a stationary first component; and a second component, movable relative to the first component, said movable component comprising a deformation element, said deformation element being configured so that a force resulting from a crash and acting on the deformation element causes the deformation element to undergo deformation prior to causing a movement of the second element relative to the first element; and
   a coupling device, said coupling device comprising at least one bracket constantly operatively connecting the first and second components,
   a locking element for moving the at least one bracket from a non-activated state outwardly toward the second component into an activated state,
   wherein in the non-activated state the at least one bracket couples the first and second components with a first coupling force so as to allow movement of the first component in relation to the second component with low energy conversion, and in the activated state the at least one bracket couples the first and second components with a second coupling force higher than the first coupling force, so as to allow transmission of forces between the first and second component, wherein at least one of the first and second components undergoes a plastic deformation when the forces exceed a defined force level.

2. The device of claim 1, wherein the device is constructed for installation in a motor vehicle.

3. The device of claim 1, wherein the locking element is configured as a bolt, which is movable from an unlocked position into a locked position.

4. The device of claim 2, wherein the stationary component is arranged on a baffle plate of a longitudinal member of the motor vehicle.

5. The device of claim 4, wherein the movable component at least partially moves into the first component in the event of a crash when the coupling device is in the activated state.

6. The device of claim 4, wherein the movable component and the stationary component are plastically deformable by folding in the event of a crash when the coupling device is in the activated state.

7. The device of claim 2, wherein the first component is connected to a longitudinal member of the motor vehicle.

8. The device of claim 7, wherein the second component at least partially moves into the longitudinal member in the event of a crash when the coupling device is in the deactivated state.

9. The device of claim 7, wherein in the activated state of the coupling device, the movable component at least partially moves into the longitudinal member in the case of a crash, and wherein the coupling device plastically deforms the movable component by means of shearing during the movement of the movable component into the longitudinal member.

10. The device of claim 7, wherein in the activated state of the coupling device, the movable component is blocked in the event of a crash and is plastically deformable by folding.

11. The device of claim 4, wherein the longitudinal member is configured as a single-chamber hollow section or as a two-chamber section.

* * * * *